(12) United States Patent
Kublick (10) Patent No.: US 12,186,730 B2
(45) Date of Patent: Jan. 7, 2025

(54) ELECTRICALLY HEATED REACTOR

(71) Applicant: TPS IP, LLC, Cleveland, OH (US)

(72) Inventor: Donald Kublick, Benton Harbor, MI (US)

(73) Assignee: TPS IP, LLC, Cleveland, OH (US)

( * ) Notice: Subject to any disclaimer, the term of this patent is extended or adjusted under 35 U.S.C. 154(b) by 286 days.

(21) Appl. No.: 17/660,054

(22) Filed: Apr. 21, 2022

(65) Prior Publication Data

US 2023/0338917 A1 Oct. 26, 2023

(51) Int. Cl.
*B01J 19/24* (2006.01)
*B01J 19/00* (2006.01)
*H05B 3/42* (2006.01)

(52) U.S. Cl.
CPC ....... *B01J 19/2425* (2013.01); *B01J 19/0013* (2013.01); *H05B 3/42* (2013.01); *B01J 2219/00135* (2013.01)

(58) Field of Classification Search
CPC ......... B01J 8/00; B01J 8/02; B01J 8/06; B01J 8/067; B01J 19/00; B01J 19/0006; B01J 19/0013; B01J 19/24; B01J 19/2415; B01J 19/2425; B01J 2208/00; B01J 2208/00008; B01J 2208/00017; B01J 2208/00389; B01J 2208/00415; B01J 2219/00; B01J 2219/00049; B01J 2219/00051; B01J 2219/00132; B01J 2219/00135; H05B 1/00; H05B 1/02; H05B 1/0227; H05B 1/023; H05B 1/0244; H05B 3/00; H05B 3/40; H05B 3/42

See application file for complete search history.

(56) References Cited

U.S. PATENT DOCUMENTS

| | | | |
|---|---|---|---|
| 5,785,942 A * | 7/1998 | Hippel | B01J 12/007 423/376 |
| 7,202,088 B2 * | 4/2007 | Haas | B01L 7/00 422/138 |
| 10,267,574 B2 * | 4/2019 | Oliva | F28F 9/02 |

* cited by examiner

*Primary Examiner* — Natasha E Young
(74) *Attorney, Agent, or Firm* — Amin, Turocy & Watson, LLP (57) ABSTRACT

Techniques regarding electrically heating a reactor are provided. For example, one or more embodiments described herein can comprise a reaction tube positioned within a reactor body. The apparatus can also comprise a plurality of electric heating elements positioned within the reactor body and adjacent to the reaction tube. The plurality of electric heating elements can be arranged parallel to each other and perpendicular to the reaction tube.

20 Claims, 10 Drawing Sheets

ELECTRICALLY HEATED REACTOR

TECHNICAL FIELD

The subject disclosure relates to electrically heated reactors, and more specifically, to reactors that can employ electrical heating elements to achieve heating zones along the length of one or more reaction tubes.

BACKGROUND

Reactors are typically utilized to execute one or more chemical reactions and produce a desired product. For example, catalytic reactors include one or more reaction tubes that can house one or more catalysts. One or more fluid reactants can be supplied to a first end of the reaction tubes, and a product is collected at a second end of the reaction tubes. As the fluid reactant travels through the reaction tube (e.g., from the first end to the second end), the reactant can be exposed to one or more catalysts that promote the chemical reaction that synthesizes the product. Additionally, the reaction tubes can be heated to further facilitate the chemical reaction. Typically, catalytic reactors are gas heated; however, gas heating can limit the location of the heat source in relation to the reaction tubes and/or can result in undesirable heat distributions across the length of the reaction tubes.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, apparatuses, systems, and/or methods that can regard electrically heated reactors are described.

According to an embodiment, an apparatus is provided. The apparatus can comprise a reaction tube positioned within a reactor body. The apparatus can also comprise a plurality of electric heating elements positioned within the reactor body and adjacent to the reaction tube. The plurality of electric heating elements can be arranged parallel to each other and perpendicular to the reaction tube.

According to an embodiment, a catalytic reactor is provided. The catalytic reactor can comprise a reaction channel positioned within a reactor body. The catalytic reactor can also comprise a first electric heating element positioned within the reactor body, perpendicular to the reaction channel, and adjacent to a first segment of the reaction channel along a length of the reaction channel. Further, the catalytic reactor can comprise a second electric heating element positioned within the reactor body, perpendicular to the reaction channel, and adjacent to a second segment of the reaction channel along the length of the reaction channel.

According to an embodiment, a method is provided. The method can comprise heating a first segment of a reaction tube to a first temperature via a first electric heating element. The method can also comprise heating a second segment of the reaction tube to a second temperature via a second electric heating element. The first electric heating element and the second heating element can be arranged perpendicular to the reaction tube within the catalytic reactor.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. Further, where the drawings depict multiples of a subject feature, the feature is labeled with a reference numerous just once to avoid obscuring the illustrations.

Various embodiments described herein include apparatuses, systems, and/or methods regarding one or more electrically heated reactors comprising one or more reaction tubes. For example, one or more reactors can comprise electrical heating elements positioned perpendicular, or substantially perpendicular, to the one or more reaction tubes. Further, the electrical heating elements can be positioned adjacent to the reaction tubes and/or along the length of the reaction tubes. In some embodiments, the length of the reaction tubes can be divided into designated heating zones, where the heating elements associated with a first heating zone can be operated independent of the heating elements associated with a second heating zone. Thereby, different portions of a given reaction tube (e.g., along the length of the reaction tube) can be heated to different temperatures. By operating the heating zones independent of each other, the reactor can control and/or vary the heat flux experienced within the reaction tubes along the length of the reaction tubes.

Figure 1:
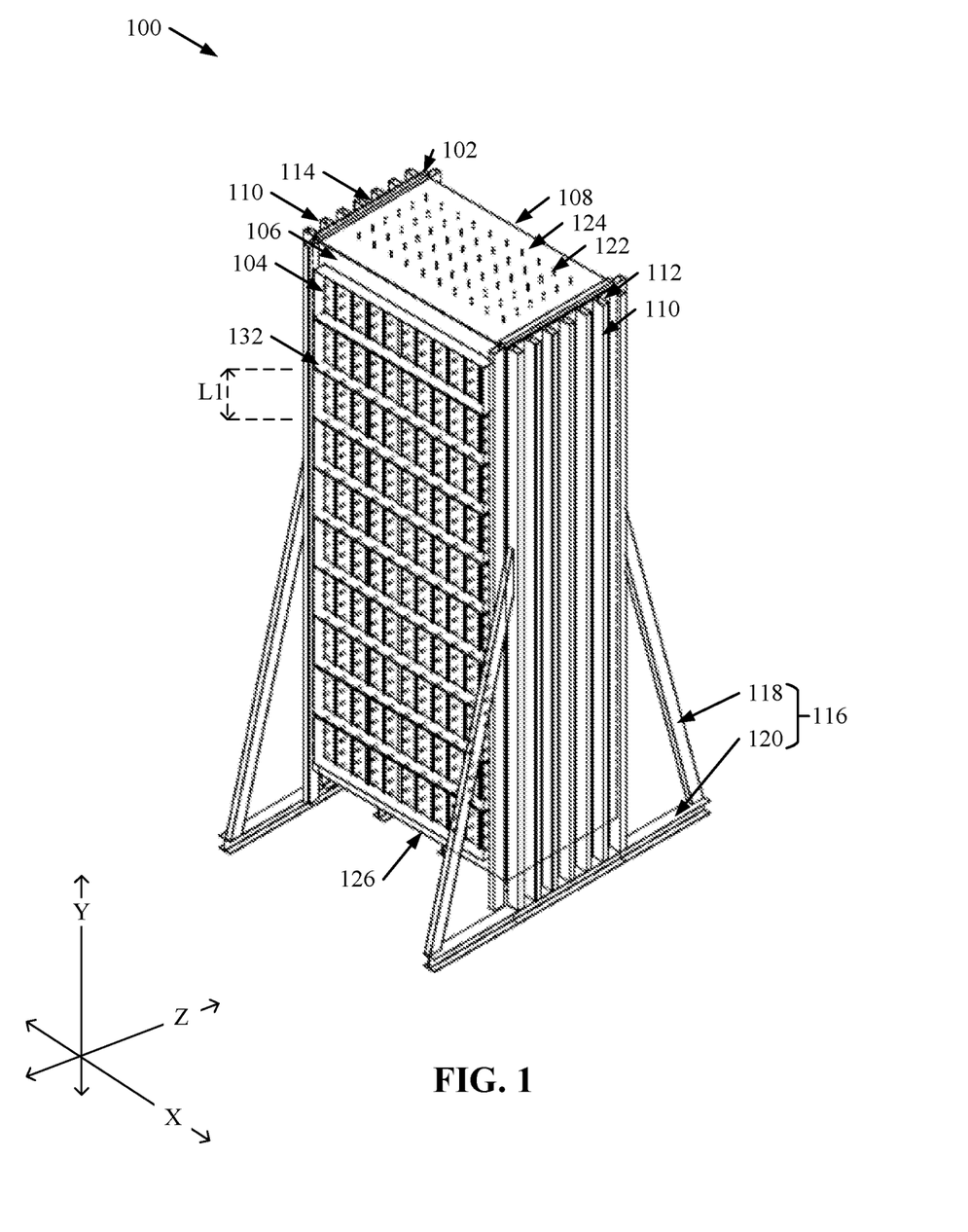
FIG. 1 illustrates a diagram of an example, non-limiting reactor that can comprise a plurality of electrical heating elements positioned adjacent to one or more reaction tubes in accordance with one or more embodiments described herein.

FIG. 1 illustrates a diagram of an example, non-limiting reactor 100 that can be electrically heated in accordance with one or more embodiments described herein. In various embodiments, the reactor 100 can be a catalytic reactor. As shown in FIG. 1, the reactor 100 can comprise a body 102 that can house one or more electrical heating elements 104. The electrical heating elements 104 can extend through the body 102 from a front surface 106 of the body 102 to a back surface 108 of the body 102 (e.g., along the Z axis shown in FIG. 1). In one or more embodiments, the one or more electric heating elements 104 can extend through the front surface 106 and/or the back surface 108 of the body 102. Additionally, one or more reinforcement ribs 110 can be positioned on a first side 112 and/or second side 114 of the body 102. Moreover, one or more stands 116 can be fixed to the one or more reinforcement ribs 110. FIG. 1 depicts an exemplary stand 116 comprising a plurality of struts 118 fixed to a base 120 at each of the first side 112 and/or the second side 114. For instance, the struts 118 can extend from one or more of the reinforcement ribs 110 to the base 120. As shown in FIG. 1, the stand 116 can secure the body 102 in a desired orientation (e.g., in a vertical orientation along the Y axis shown in FIG. 1). While FIG. 1 depicts the stands 116 in an A-frame architecture, other architectures are also envisaged.

Example materials that can comprise the body 102 of the reactor 100 can include, but are not limited to: steel, stainless steel, a combination thereof, and/or the like. Further, example materials that can comprise the one or more reinforcement ribs 110 can include, but are not limited to: steel, stainless steel, a combination thereof, and/or the like. Additionally, example materials that can comprise the one or more stands 116 of the reactor 100 can include, but are not limited to: steel, stainless steel, a combination thereof, and/or the like. In one or more embodiments, the interior surface of the body 102 can be coated with one or more insulating materials, such as insulating ceramic fiber. The dimensions (e.g., length, width, and depth) of the reactor 100 can vary depending on the desired application. In various embodiments, the length (e.g., along the Y axis shown in FIG. 1) can range from, for example, greater than or equal to 128 inches and less than or equal to 1040 inches (e.g., 560 inches). The width (e.g., along the X axis shown in FIG. 1) can range from, for example, greater than or equal to 80 inches and less than or equal to 888 inches (e.g., 241 inches). The depth (e.g., along the Z axis shown in FIG. 1) can range from, for example, greater than or equal to 226 inches and less than or equal to 408 inches (e.g., 308 inches).

As shown in FIG. 1, one or more inlet channels 122 can extend through the top surface 124 and/or bottom surface 126 of the reactor's 100 body 102. In various embodiments, the one or more inlet channels 122 can extend through the top surface 124 and be in fluid communication with one or more reaction tubes 128 (e.g., shown in FIGS. 4-5 and 8), which can be housed within the body 102. Likewise, one or more outlet channels 130 (e.g., shown in FIG. 2) can extend through the bottom surface 126 and be in fluid communication with the one or more reaction tubes 128. In various embodiments, the one or more reaction tubes 128 can be reaction channels that house one or more chemical reactants and/or catalysts during a chemical reaction. For instance, one or more chemical reactants and/or catalysts can be supplied to the one or more housed reaction tubes 128 via the one or more inlet channels 122, and one or more chemical products can be collected from the one or more housed reaction tubes 128 via the one or more outlet channels 130.

In various embodiments, the reactor 100 can comprise a plurality of electric heating elements 104 arranged into one or more groups. For example, the one or more groups can be defined along the length of the reaction tubes 128 and/or length of the reactor 100 (e.g., along the Y axis shown in FIG. 1). For instance, FIG. 1 depicts an exemplary embodiment in which the reactor 100 comprises electric heating elements 104 arranged into 10 groups along the Y axis. In some embodiments, groups of electric heating elements 104 can be delineated by one or more panels 132 skirting the perimeter of the associate group (e.g., as show in FIG. 1).

Within each group, the electric heating elements 104 can be arranged in a series of columns (e.g., along the Y axis shown in FIG. 1) and/or rows (e.g., along the X axis shown in FIG. 1). The length L1 of the electric heating element 104 groupings can vary. For instance, the length L1 of the electric heating element 104 groups can range from, for example, greater than or equal to 1 foot and less than or equal to 8 feet (e.g., 4 feet). In one or more embodiments, the length L1 of the electric heating element 104 groupings can be constant amongst the groups. Alternatively, in some embodiments the length L1 of the electric heating element 104 groupings can vary from one group to another. For instance, a first group of electric heating elements 104 can have a first Length L1 spanning four feet while a second group of electric heating elements 104 can have a length L1 spanning two feet. In various embodiments, the electric heating element 104 groupings can extend across the entire, or substantially entire, width (e.g., along the X axis) the body 102 (e.g., across the width of the front surface 106 and/or back surface 108 of the body 102). In some embodiments, the electric heating element 104 groupings can extend across a portion of the width (e.g., along the X axis) the body 102 (e.g., across the width of the front surface 106 and/or back surface 108 of the body 102). For instance, two or more electric heating elements 104 groupings can be positioned adjacent to each other at equivalent heights along the length (e.g., along the Y axis) of the reactor 100. The number of rows and/or columns of electric heating elements 104 per grouping can vary based on the number of reaction tubes 128 housed within the body 102 of the reactor 100 and/or the desired heating profile to be implemented along the length (e.g., along the Y axis) of the reaction tubes 128.

Figure 9:
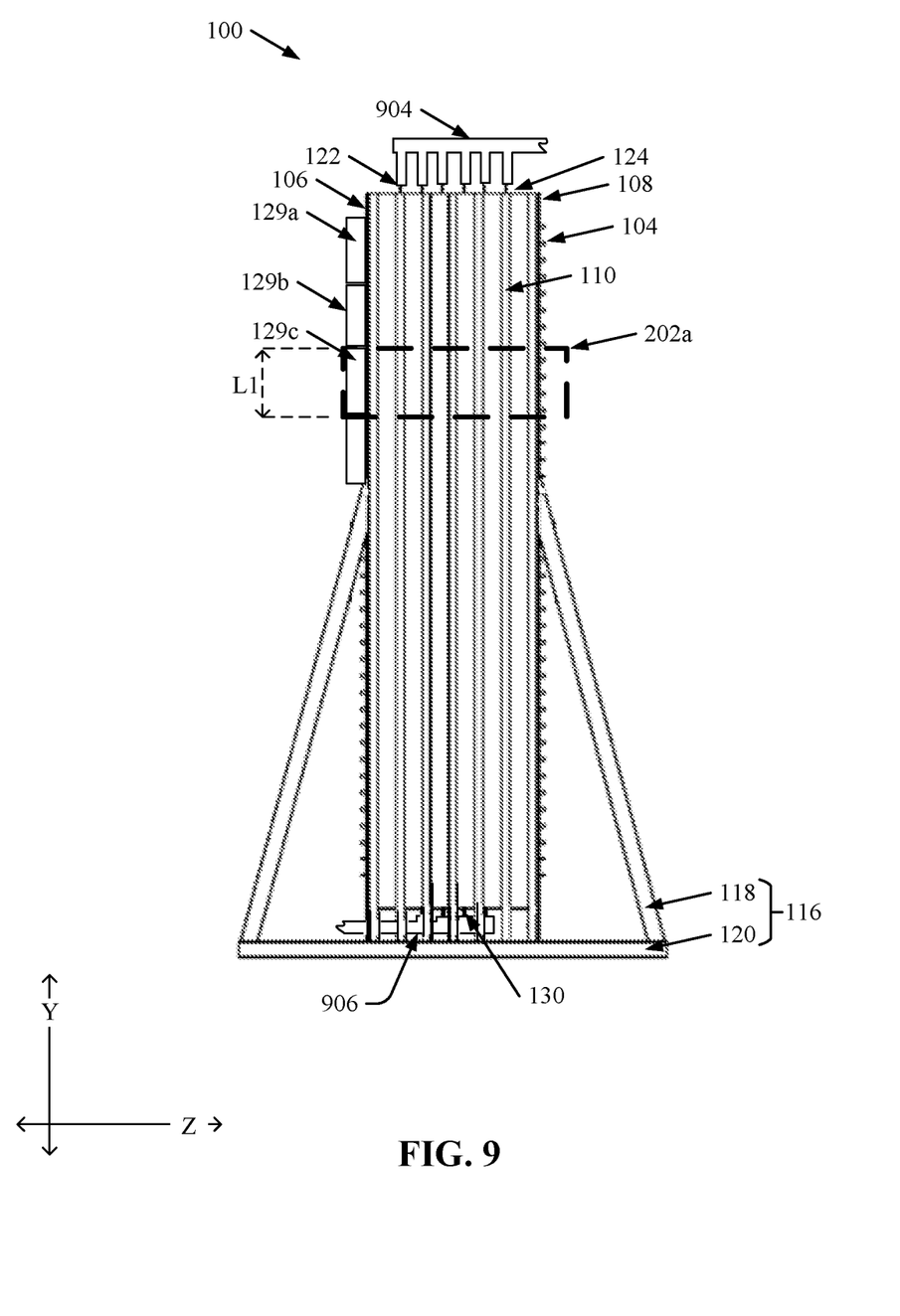
FIG. 9 illustrates a diagram of an example, non-limiting electrically heated reactor with supply and/or product lines connected to reaction tubes in accordance with one or more embodiments described herein.

In one or more embodiments, the one or more electric heating elements 104 can be operably coupled to one or more controllers 129 (e.g., as shown in FIG. 9) to control operation of the one or more electric heating elements 104. For instance, the one or more electric heating elements 104 can be coupled to one or more controllers 129 via one or more thermocouples, such as inconel sheathed chromel-alumel (type K) thermocouples. For example, the one or more electric heating elements 104 can generate and/or radiate heat from electrical energy. Example types of electric heating elements 104 can include, but are not limited to: recrystallized silicon carbine resistance type heating elements made from high purity alpha silicon carbide crystals, alloy conductors, a combination thereof, and/or the like. For instance, the one or more electric heating elements 104 can be operably coupled to, and controlled by, one or more controllers 129 comprising a proportional-integral-derivative ("PID") controller, main circuit breaker, SCR power controller, a safety contactor, and/or one or more other control components housed in an NEMA rated enclosure. Additionally, the one or more controllers 129 can include one or more transformers (e.g., a three phase tapped step down transformer) to provide increase voltage to the one or more electric heating elements 104 (e.g., silicon carbide elements) as the electric heating elements 104 slowly increase in electrical resistance over time. For instance, the transformer taps can have six positions to deliver a two-fold increase in voltage to account for up to a four times increase in silicon carbide element resistance. Moreover, the one or more controllers 129 can include one or more monitor systems (e.g., a programmable logic controller ("PLC") and/or an MMI. In various embodiments, the electric heating elements 104 of the same group can be operated in unison with each other and independent of the electric heating elements 104 of another group.

Further, the electric heating elements 104 can be configured as rods extending through the depth (e.g., along the Z axis shown in FIG. 1) of the reactor 100. In various embodiments, the one or more electric heating elements 104 can be inserted through ports positioned on the front surface 106 and/or back surface 108 of the reactor 100. In one or more embodiments, the ports can be adjustable to accept electric heating element 104 rods of various size and/or dimension.

Figure 2:
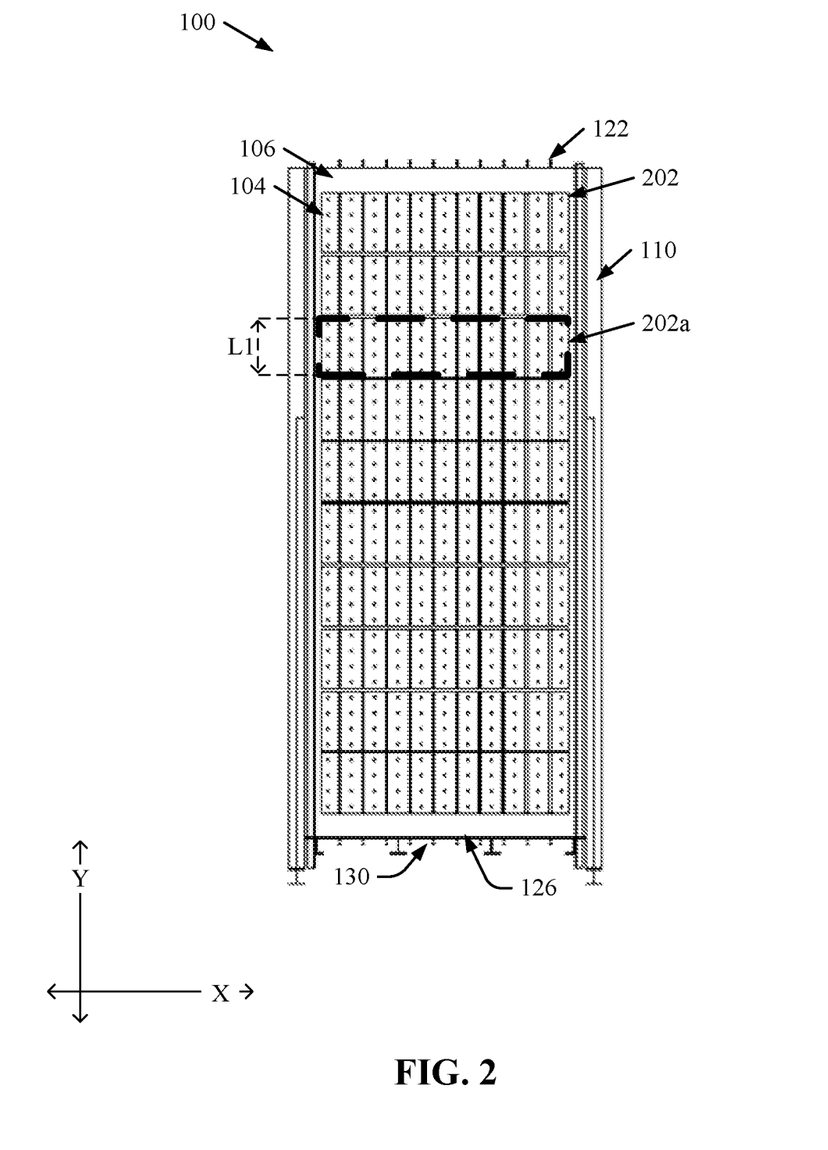
FIG. 2 illustrates a diagram of an example, non-limiting front view of a reactor that can comprise a plurality of electrical heating elements positioned adjacent to one or more reaction tubes in accordance with one or more embodiments described herein.

FIG. 2 illustrates a diagram of the example, non-limiting front-facing perspective of the reactor 100 in accordance with one or more embodiments described herein. Repetitive description of like elements employed in other embodiments described herein is omitted for the sake of brevity. FIG. 2 depicts an exemplary arrange of electric heating elements 104, which can pass through the front surface 106 of the body 102 in accordance with various embodiments described herein. For example, FIG. 2 shows an exemplary arrangement in which the electric heating elements 104 are sorted into ten groups 202 along the length (e.g., along the Y axis) of the reactor 100. For instance, an exemplary first group 202a is delineated in FIG. 2 via bold dashed lines.

As shown in FIG. 2, the one or more outlet channels 130 can extend through the bottom surface 126 of the body 102. In various embodiments, one or more reaction tubes 128 (e.g., shown in FIG. 4) can be housed in the body 102 and oriented length wise (e.g., along the Y axis shown in FIG. 2) such that each reaction tube 128 can comprise a first end is in fluid communication with an inlet channel 122 and a second end is in fluid communication with the outlet channel 130. In one or more embodiments, one or more chemical reactants can enter the one or more reaction tubes 128 through the one or more inlet channels 122, travel through the one or more reaction tubes 128 (e.g., along the Y axis shown in FIG. 2), and exit the one or more reaction tubes 128 through the one or more outlet channels 130. As the chemical reactants travel through the reaction tubes 128, the chemical reactants can experience different heating conditions at respective sections of the reaction tubes 128 based on the positional relationship between the respective sections and adjacent electric heating element 104 groups.

Figure 3:
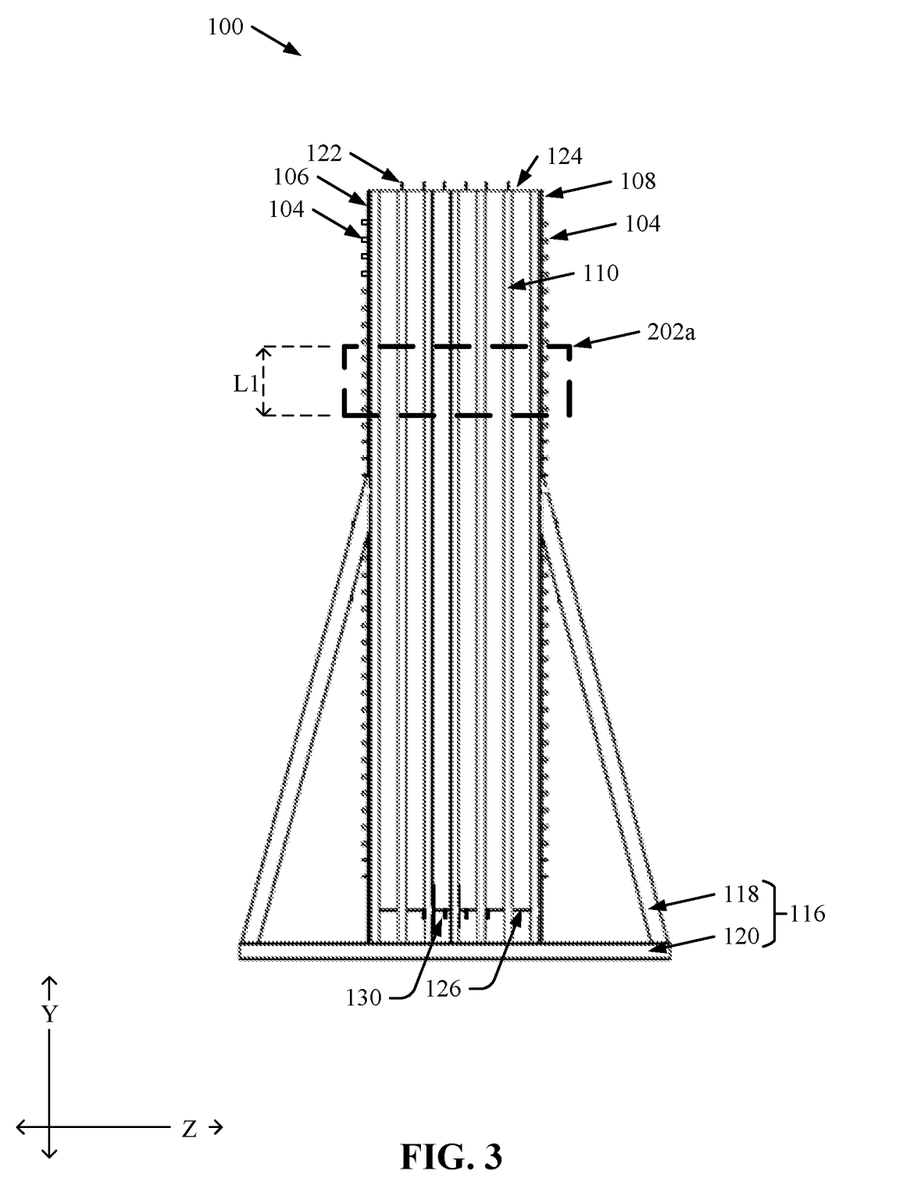
FIG. 3 illustrates a diagram of an example, non-limiting side view of a reactor that can comprise a plurality of electrical heating elements positioned adjacent to one or more reaction tubes in accordance with one or more embodiments described herein.

FIG. 3 illustrates a diagram of an example, non-limiting side-facing perspective of the reactor 100 in accordance with one or more embodiments described herein. Repetitive description of like elements employed in other embodiments described herein is omitted for the sake of brevity. As shown in FIG. 3, in one or more embodiments the one or more electric heating elements 104 can extend through the depth (e.g., along the Z axis shown in FIG. 3) of the reactor 100. For instance, the one or more electric heating elements 104 can extend through the front surface 106, through the body 102 (e.g., along the Z axis shown in FIG. 3), and through the back surface 108 of the body 102. The reactor 100 is shown in FIG. 3 without the panels 132 to improve visibility of one or more of the features.

In various embodiments, the one or more electric heating elements 104 can be accessible via ports in the front surface 106 and/or back surface 108 to facilitate one or more maintenance operations. For example, when it is desired to replace an electric heating element 104, the electric heating element 104 can be extracted from the body 102 via the front surface 106 and/or the back surface 108 without compromising the integrity of the body 102. For instance, the electric heating elements 104 can be accessed (e.g., via ports in the front surface 106 and/or back surface 108) without deconstructing one or more walls of the reactor's 100 body 102. In another instance, respective electric heating elements 104 can be accessed (e.g., via ports in the front surface 106 and/or back surface 108) without displacing other electric heating elements 104.

Figure 4:
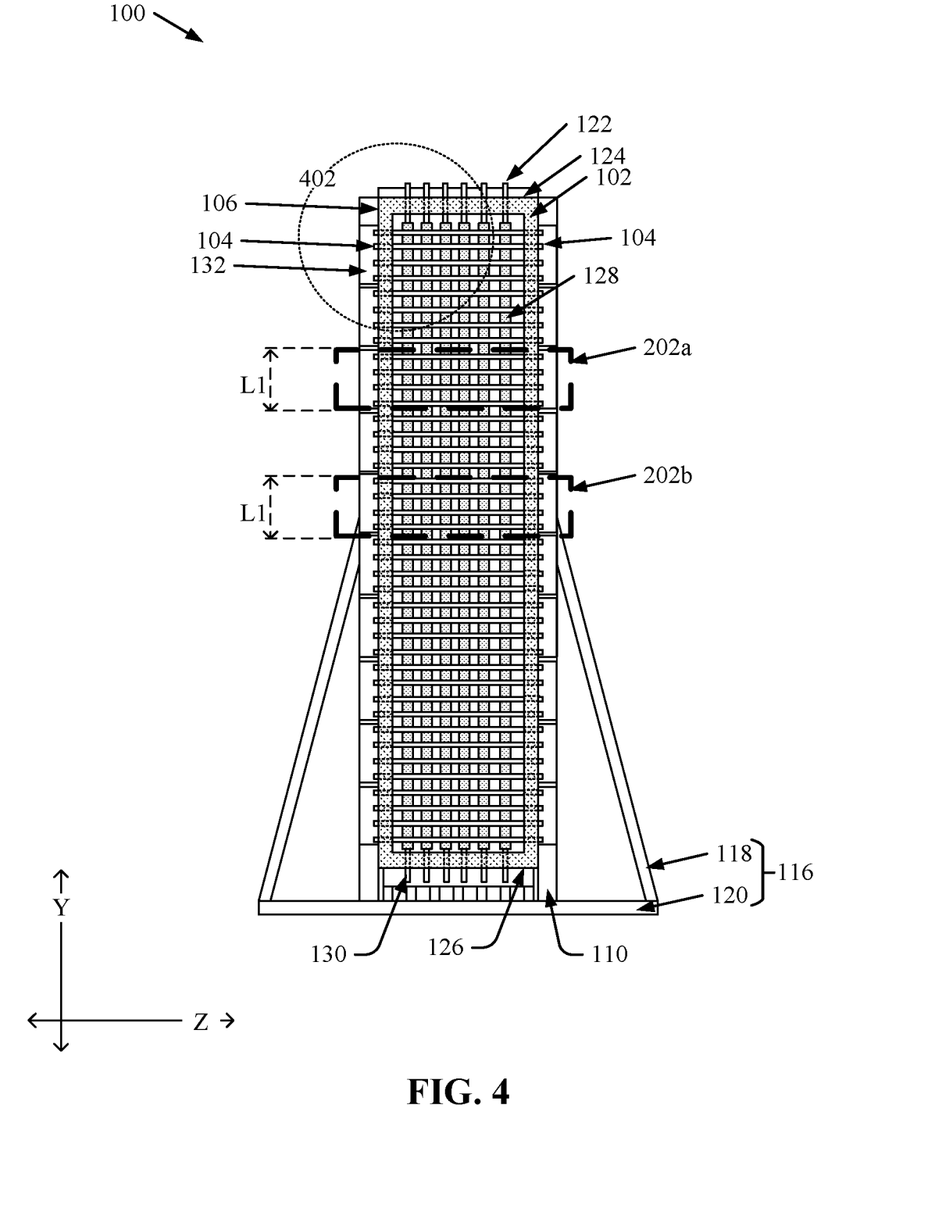
FIG. 4 illustrates a diagram of an example, non-limiting cross-section of a reactor that can comprise a plurality of electrical heating elements positioned adjacent to one or more reaction tubes in accordance with one or more embodiments described herein.
Figure 5:
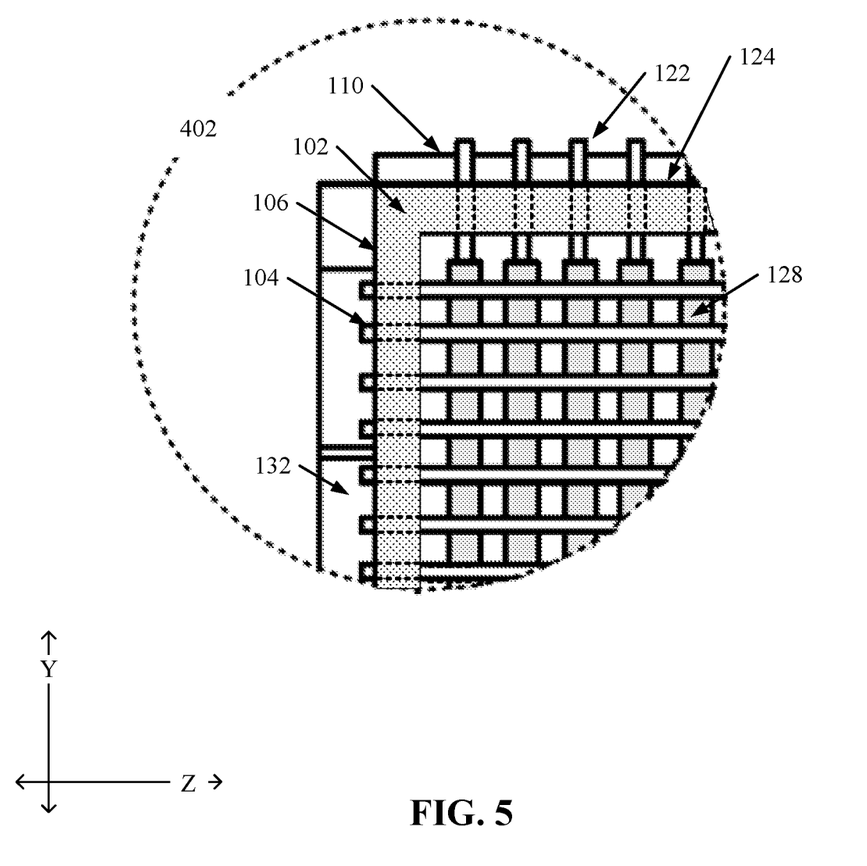
FIG. 5 illustrates a diagram of an example, non-limiting cross-section of an enlarged portion of a reactor that can comprise a plurality of electrical heating elements positioned adjacent to one or more reaction tubes in accordance with one or more embodiments described herein.

FIG. 4 illustrates a diagram of an example, non-limiting cross-sectional view of the reactor 100 in accordance with one or more embodiments described herein. Also, FIG. 5 illustrates a diagram of an example, non-limiting enlarged portion 402 of FIG. 4. Repetitive description of like elements employed in other embodiments described herein is omitted for the sake of brevity. FIGS. 4-5 show the one or more reaction tubes 128 housed within the body 102 of the reactor 100.

As shown in FIGS. 4-5, the one or more reaction tubes 128 can be oriented in the length direction (e.g., along the Y axis shown in FIG. 4) of the reactor 100, while the one or more electric heating elements 104 can be oriented along the depth direction (e.g., along the Z axis shown in FIG. 4) of the reactor 100. As the electric heating elements 104 extend along the depth direction (e.g., along the Z axis shown in FIG. 4) of the reactor 100, the electric heating elements 104 can be positioned adjacent to one or more of the reaction tubes 128.

Due to the proximity of the one or more electric heating elements 104 to the one or more reaction tubes 128 within the body 102, the electric heating elements 104 can heat the one or more reaction tubes 128. For instance, respective electric heating elements 104 can heat respective portions of the adjacent reaction tubes 128. Likewise, respective electric heating element 104 groups (e.g., exemplary first group 202a) can heat respective segments (e.g., along the Y axis shown in FIG. 4) of the one or more reaction tubes 128. Where respective electric heating element 104 groups are operated independently of each other, the heating of respective segments of the one or more reaction tubes 128 can be performed independent of other segments (e.g., along the Y axis shown in FIG. 4). Thereby, the one or more reaction tubes 128 can comprise various stages of heating along the length (e.g., along the Y axis shown in FIG. 4) of the one or more reaction tubes 128, where each heating stage can be associated with one or more respective electric heating element 104 groups. Further, respective heating stages can experience the same or different amounts of heating. Where respective heating stages experience different amounts of heating, one or more chemical reactants can be subject to different amounts of heat as the chemical reactants travel from the one or more inlet channels 122, through the one or more reaction tubes 128, and through the one or more outlet channels 130.

In one or more embodiments, the one or more chemical reactants can undergo a chemical reaction while traveling within the one or more reaction tubes 128. Further, the chemical reaction can be influenced, catalyzed, suppressed, or otherwise controlled by the heating of the one or more reaction tubes 128 by the one or more electric heating elements 104. In some embodiments, the chemical reaction can comprise multiple reaction stages, where a respective amount of heat is desired for each reaction stage. In such cases, the one or more electric heating elements 104 can be controlled to define heating stages along the length of the one or more reaction tubes 128 that correlate with the reaction stages of the chemical reaction occurring within the one or more reaction tubes 128.

For example, FIG. 4 delineates an exemplary second group 202b of electric heating elements 104 positioned downstream from the first group 202a. In one or more embodiments, the first group 202a can be independently controlled from the second group 202b. For instance, the first group 202a can be controlled to generate a first amount of heat, thereby heating a first segment (e.g., adjacent to the electric heating elements 104 of the first group 202a) of reaction tubes 128 to a first temperature. Also, the second group 202b can be controlled to generate a second amount of heat that is different than the first amount of heat (e.g., where the second amount of heat is greater than the first amount of heat), thereby heating a second segment (e.g., adjacent to the electric heating elements 104 of the second group 202b) of the reaction tubes 128 to a second temperature (e.g., where the second temperature is greater than the first temperature). As the chemical reactants travel through the first segment, the chemical reactants can be heated by the first temperature and undergo a first reaction stage. Subsequently the chemical reactants can continue to travel through the reaction tubes 128 (e.g., flowing downward towards the bottom surface 126 due to at least gravitational forces) and enter the second segment. As the chemical reactants travel through the second segment, the chemical reactants can be heated by the second temperature and undergo a second reaction stage. For instance, the second reaction stage can be catalyzed by the increased amount of heat provided in the second segment of the reaction tubes 128.

FIG. 5 depicts an enlarged portion 402 of the illustration depicted in FIG. 4. As shown in FIG. 5, dashed lines can indicate that the one or more electric heating elements 104, inlet channels 122, and/or outlet channels 130 extend through the walls of the body 102. For instance, the one or more electric heating elements 104 can protrude from the front surface 106 of the body 102, whereby the one or more electric heating elements 104 can be operably coupled to one or more controllers and/or accessed to implement one or more maintenance operations. Also, the one or more inlet channels 122 can protrude from the top surface 124 of the body 102, whereby the one or more inlet channels 122 can be coupled to one or more input supplies (e.g., chemical reactant and/or catalyst supplies).

Figure 6:
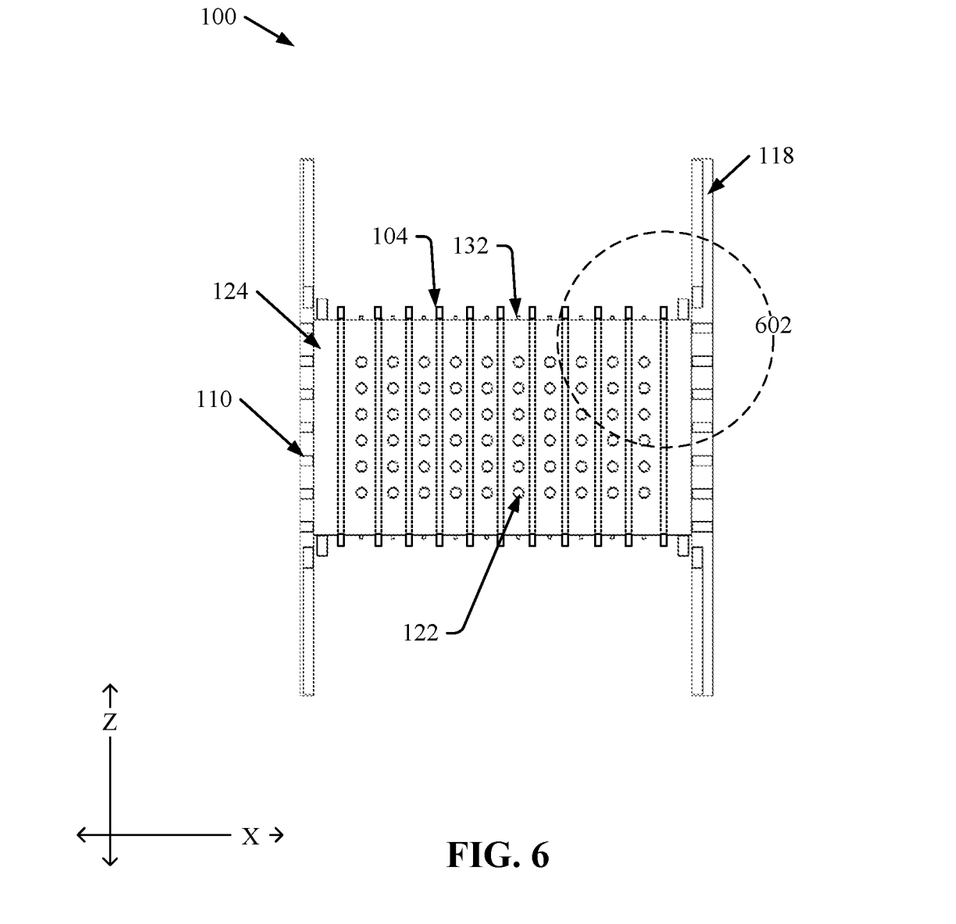
FIG. 6 illustrates a diagram of an example, non-limiting top-down view of a reactor that can comprise a plurality of electrical heating elements positioned adjacent to one or more reaction tubes in accordance with one or more embodiments described herein.
Figure 7:
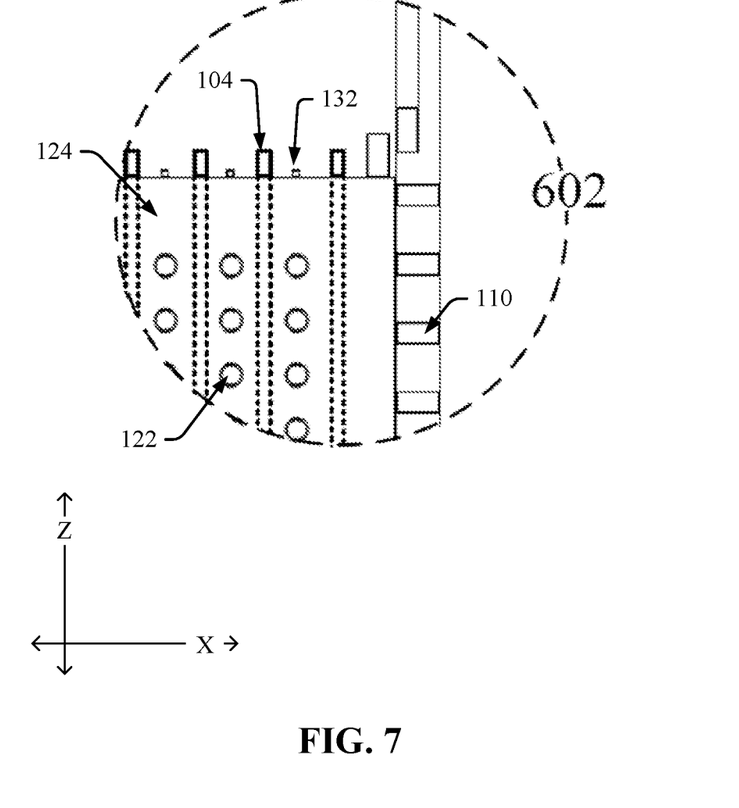
FIG. 7 illustrates a diagram of an example, non-limiting top-down view of an enlarged portion of a reactor that can comprise a plurality of electrical heating elements positioned adjacent to one or more reaction tubes in accordance with one or more embodiments described herein.

FIG. 6 illustrates a diagram of an example, non-limiting top-down view of the reactor 100 in accordance with one or more embodiments described herein. Also, FIG. 7 illustrates a diagram of an example, non-limiting enlarged section 602 of the illustration shown in FIG. 6. Repetitive description of like elements employed in other embodiments described herein is omitted for the sake of brevity. As shown in FIG. 6, the one or more inlet channels 122 can be arranged in one or more rows and/or columns. Further, each inlet channel 122 can be in fluid communication with one or more reaction tubes 128. Thereby, the one or more reaction tubes 128 can also be arranged in accordance with the layout of the one or more inlet channels 122.

FIG. 7 depicts an enlarged section 602 of the illustration depicted in FIG. 6. As shown in FIG. 7, dashed lines can indicate that the one or more electric heating elements 104 extend through the body 102 along the depth direction (e.g., along the Z axis shown in FIG. 7). Further, the electric heating elements 104 can extend between columns and/or rows of the one or more reaction tubes 128 (e.g., which can be aligned with the one or more inlet channels 122).

Figure 8:
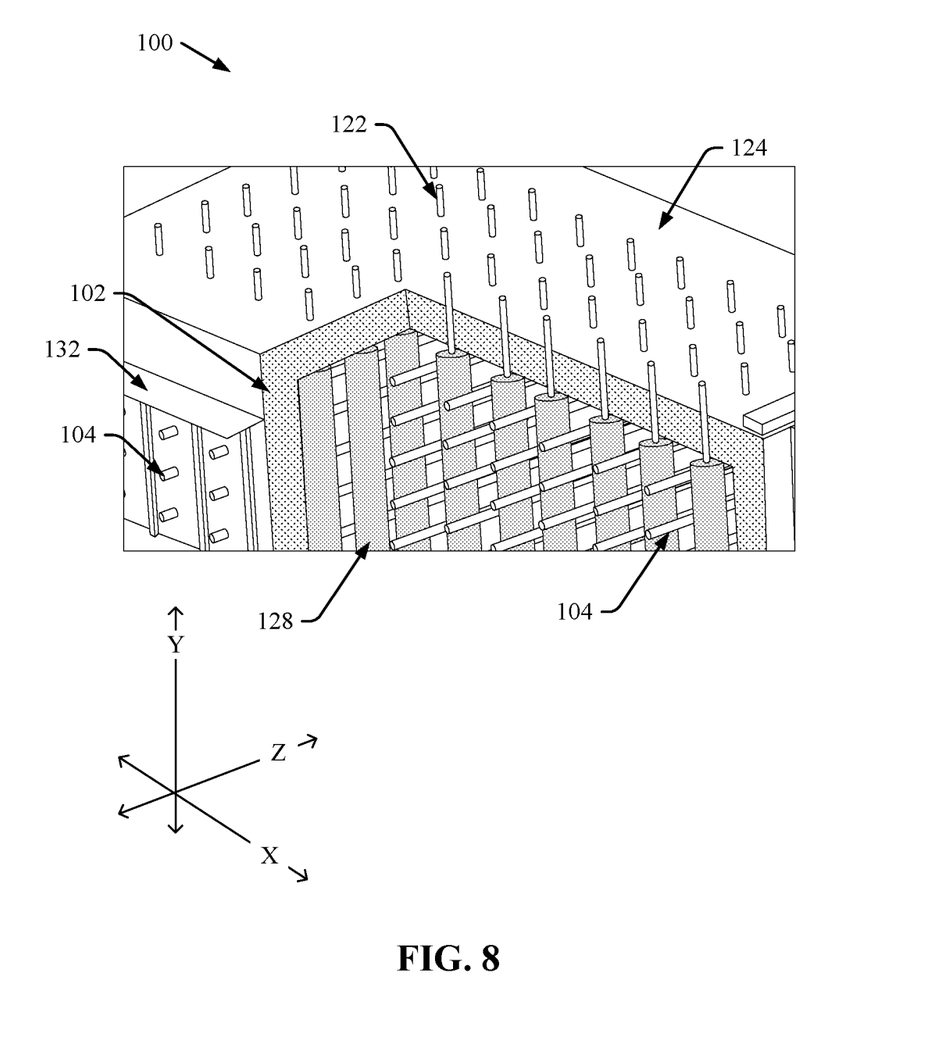
FIG. 8 illustrates a diagram of an example, non-limiting interior view of a reactor that can comprise a plurality of electrical heating elements positioned adjacent to one or more reaction tubes in accordance with one or more embodiments described herein.

FIG. 8 illustrates a diagram of an example, non-limiting cut-out section of the reactor 100 in accordance with one or more embodiments described herein. Repetitive description of like elements employed in other embodiments described herein is omitted for the sake of brevity. FIG. 8 shows an upper portion of the reactor 100 shown in FIG. 1, where a corner section of the reactor 100 has been removed to illustrate an exemplary arrangement of electric heating elements 104 and reaction tubes 128 within the body 102.

As shown in FIG. 8, the one or more reaction tubes 128 can be arranged in a series of rows, which can extend, for example, along the depth direction (e.g., along the Z axis shown in FIG. 8) of the reactor 100. Also, the one or more reaction tubes 128 can be arranged in a series of columns, where the series can propagate along, for example, the width direction (e.g., along the X axis shown in FIG. 8) of the reactor 100. Further, the one or more electric heating elements 104 can be positioned between rows of reaction tubes 128. For example, a reaction tube 128 can be positioned between adjacent electric heating elements 104 along the X axis shown in FIG. 8. In various embodiments, respective electric heating elements 104 can heat portions of adjacent reaction tubes 128.

FIG. 9 illustrates a diagram of another example, non-limiting side perspective of the reactor 100 in accordance with one or more embodiments described herein. Repetitive description of like elements employed in other embodiments described herein is omitted for the sake of brevity. FIG. 9 depicts the exemplary embodiment shown in FIG. 3 further comprising one or more controllers 129 (e.g., exemplary controllers 129a-c), supply lines 904, and/or product lines 906.

As shown in FIG. 9, one or more controllers 129 can be positioned at the front surface 106 of the reactor 100 and can be operably coupled to one or more electric heating elements 104. In accordance with various embodiments described herein, each electric heating element 104 grouping can be coupled to a respective controller 129. Alternatively, a single controller 129 can be coupled to multiple electric heating element 104 groupings, while operating each electric heating element grouping independent of each other.

Additionally, the one or more inlet channels 122 can be in fluid communication with one or more supply lines 904. For example, the inlet channels 122 can be collectively coupled to a common supply line 904 (e.g., as shown in FIG. 9). Alternatively, the reactor 100 can comprise multiple supply lines 904, with respective supply lines 904 coupled to one or more subsets of the inlet channels 122. In various embodiments, one or more chemical reactants and/or catalysts can be introduced to the one or more reaction tubes 128 through the one or more supply lines 904 and/or inlet channels 122. Likewise, the one or more the one or more outlet channels 130 can be in fluid communication with one or more product lines 906. For example, the outlet channels 130 can be collectively coupled to a common product line 906 (e.g., as shown in FIG. 9). Alternatively, the reactor 100 can comprise multiple product lines 906, with respective product lines 906 coupled to one or more subsets of the outlet channels 130. In various embodiments, one or more chemical products resulting from one or more chemical reactions and/or heat treatments within the reaction tubes 128 can exit the reactor 100 through the one or more outlet channels 130 and/or product lines 906.

Figure 10:
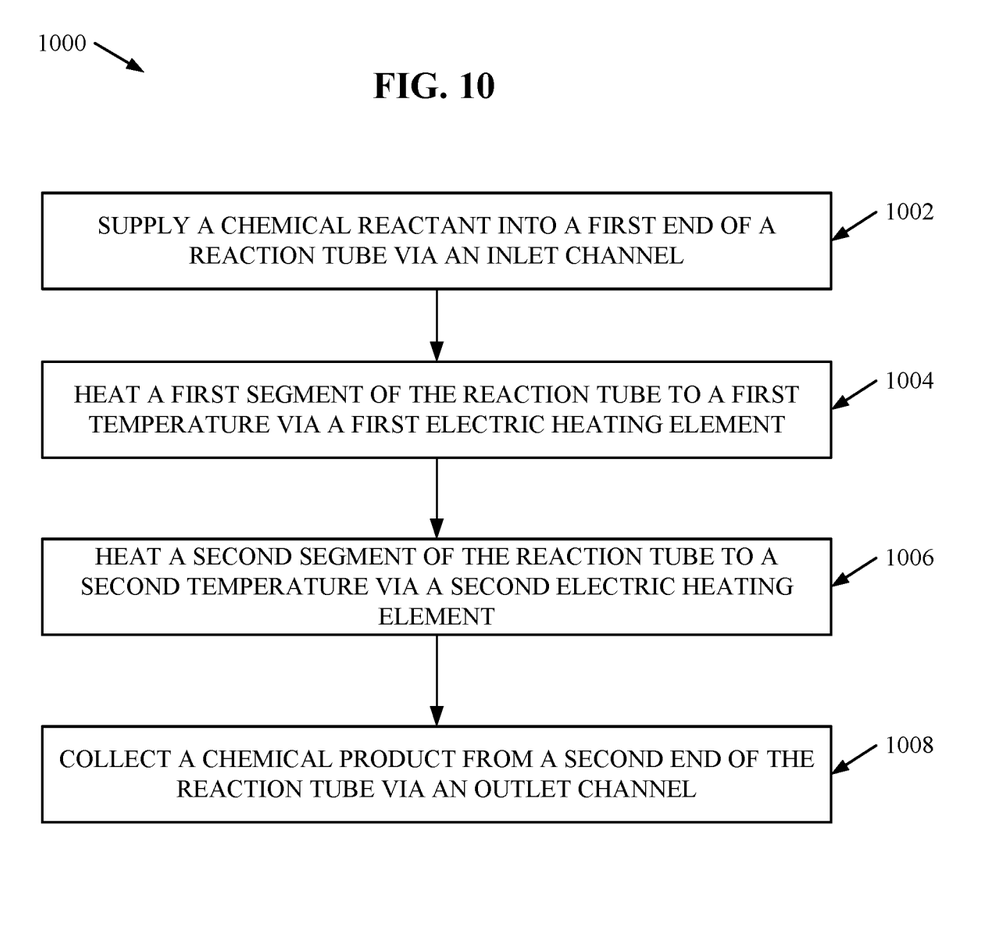
FIG. 10 illustrates a flow diagram of an example, non-limiting method for electrically heating one or more reaction tubes to facilitate a chemical reaction in accordance with one or more embodiments described herein.

FIG. 10 illustrates a flow diagram of an example, non-limiting method 1000 that can facilitate operating one or more reactors 100 in accordance with one or more embodiments described herein. Repetitive description of like elements employed in other embodiments described herein is omitted for the sake of brevity.

At 1002, the method 1000 can comprise supplying one or more chemical reactants and/or catalysts into a first end of one or more reaction tubes 128 via one or more inlet channels 122. For example, the one or more chemical reactants and/or catalysts can by supplied by one or more supply lines 904, and/or the one or more inlet channels 122 can extend through a body 102 of the reactor 100 to introduce the one or more chemical reactants and/or catalysts into the one or more reaction tubes 128.

At 1004, the method 1000 can comprise heating a first segment of the one or more reaction tubes 128 to a first temperature via one or more first electric heating elements 104. In accordance with various embodiments described herein, the one or more first electric heating elements 104 can be a subset of a plurality of electric heating elements 104 comprised within the reactor 100 (e.g., as exemplified by first group 202a and/or second group 202b). In various embodiments, the one or more first electric heating elements 104 can be operably coupled to one or more controllers 129 to control the heating operation. Further, the one or more first electric heating elements 104 can be oriented perpendicular to the one or more reaction tubes 128 within the reactor 100, where the one or more first electric heating elements 104 can be positioned adjacent to the first segment of the one or more reaction tubes 128.

At 1006, the method 1000 can comprise heating a second segment of the one or more reaction tubes 128 to a second temperature via one or more second electric heating elements 104. In accordance with various embodiments described herein, the one or more second electric heating elements 104 can be another subset of a plurality of electric heating elements 104 comprised within the reactor 100 (e.g., as exemplified by first group 202a and/or second group 202b). In various embodiments, the one or more second electric heating elements 104 can be operably coupled to one or more additional controllers 129 to control the heating operation. Further, the one or more second electric heating elements 104 can also be oriented perpendicular to the one or more reaction tubes 128 within the reactor 100, where the one or more second electric heating elements 104 can be positioned adjacent to the second segment of the one or more reaction tubes 128. For instance, the one or more first electric heating elements 104 and second electric heating elements 104 can be arranged along a length of the one or more reaction tubes 128 (e.g., along the Y axis shown in FIGS. 1-5 and 8). Additionally, the first and second temperatures can be different temperature values. For instance, the second temperature can be greater than or less than the first temperature.

At 1008, the method 1000 can comprise collecting a chemical product from a second end of the one or more reaction tubes 128 via one or more outlet channels 130. For example, the one or more chemical reactants and/or catalysts can be gravity-fed through the one or more reaction tubes 128. In some examples, the one or more chemical reactants and/or catalysts can be forced through the one or more reaction tubes 128 via one or more pressure differentials established via the one or more supply lines 904 and/or product lines 906. As the one or more chemical reactants and/or catalysts travel through the one or more reaction tubes 128, the one or more chemical reactants and/or catalysts can be subjected to a heat flux profile for the reaction tubes 128. The heat flux profile can delineate, for example, respective heat energies for respective segments of the reaction tubes 128. As the one or more chemical reactants and/or catalysts enter the respective segments, the one or more chemical reactants and/or catalysts can be subject to the associate heat energies (e.g., as defined by the heat flux profile). One or more controllers 129 can control operation of the one or more electric heating elements 104 based on the one or more heat flux profiles. Exposure to the various temperatures can facilitate control of one or more chemical reactions that produce the one or more collected chemical products.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

It is, of course, not possible to describe every conceivable combination of components, products and/or methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
a reaction tube positioned within a reactor body;
a plurality of electric heating elements positioned within the reactor body and adjacent to the reaction tube, wherein the plurality of electric heating elements are arranged parallel to each other and perpendicular to the reaction tube, wherein electric heating elements of the plurality of electric heating elements are individually removable from the reactor body.

2. The apparatus of claim 1, wherein a first end of the reaction tube is in fluid communication with an inlet channel that extends through a first wall of the reactor body, and wherein a second end of the reaction tube is in fluid communication with an outlet channel that extends through a second wall of the reactor body, and wherein the plurality of electric heating elements are positioned in a plurality of ports within the reactor body, and wherein the ports are adjustable to hold different sizes of electric heating elements.

3. The apparatus of claim 2, wherein the plurality of electric heating elements are arranged along a length of the reaction tube.

4. The apparatus of claim 3, wherein the plurality of electric heating elements are positioned adjacent to a section of the reaction tube that is between the first end and the second end.

5. The apparatus of claim 1, further comprising:
a second reaction tube positioned within the reactor body, wherein the plurality of electric heating elements are positioned between the reaction tube and the second reaction tube.

6. The apparatus of claim 5, wherein the plurality of electric heating elements are arranged perpendicular to the second reaction tube and are positioned along a length of the reaction tube and the second reaction tube.

7. The apparatus of claim 1, wherein a first electric heating element from the plurality of electric heating elements is operably coupled to a first controller, and wherein a second electric heating element from the plurality of electric heating elements is operably coupled to a second controller.

8. The apparatus of claim 7, wherein the first electric heating element is configured, by the first controller, to generate a first amount of heat, and wherein the second electric heating element is configured, by the second controller, to generate a second amount of heat.

9. The apparatus of claim 8, wherein the first amount of heat is different than the second amount of heat, wherein the first amount of heat heats a first segment of the reaction tube, and wherein the second amount of heat heats a second segment of the reaction tube.

10. A catalytic reactor, comprising:
a reaction channel positioned within a reactor body;
a first electric heating element positioned within the reactor body, perpendicular to the reaction channel, and adjacent to a first segment of the reaction channel along a length of the reaction channel; and
a second electric heating element positioned within the reactor body, perpendicular to the reaction channel, and adjacent to a second segment of the reaction channel along the length of the reaction channel, wherein the first electric heating element and the second electric heating element are individually removable from the reactor body.

11. The catalytic reactor of claim 10, wherein a first end of the reaction channel is in fluid communication with an inlet channel that extends through a first wall of the reactor body, and wherein a second end of the reaction channel is in fluid communication with an outlet channel that extends through a second wall of the reactor body, and wherein the first electric heating element and the second electric heating element are positioned in ports within the reactor body, and wherein the ports are adjustable to hold different sizes of electric heating elements.

12. The catalytic reactor of claim 11, wherein the second segment is downstream the first segment with regards to a fluid flow through the reaction channel.

13. The catalytic reactor of claim 10, further comprising:
a second reaction channel positioned within the reactor body, wherein the first electric heating element and the second electric heating element are located between the reaction channel and the second reaction channel.

14. The catalytic reactor of claim 10, further comprising:
a first controller operably coupled to the first electric heating element, wherein the first electric heating element is configured, by the first controller, to generate a first amount of heat;
a second controller operably coupled to the second electric heating element, wherein the second electric heating element is configured, by the second controller, to generate a second amount of heat that is different than the first amount of heat.

15. A method for operating a catalytic reactor, the method comprising:
heating a first segment of a reaction tube to a first temperature via a first electric heating element;
heating a second segment of the reaction tube to a second temperature via a second electric heating element, wherein the first electric heating element and the second heating element are arranged perpendicular to the reaction tube within the catalytic reactor, wherein the first electric heating element and the second electric heating element are individually removable from the catalytic reactor.

16. The method of claim 15, further comprising:
supplying a chemical reactant into a first end of the reaction tube via an inlet channel; and
collecting a chemical product from a second end of the reaction tube via an outlet channel.

17. The method of claim 16, wherein a flow of the chemical reactant is defined from the first end to the second end, and wherein the second segment of the reaction tube is downstream the first segment of the reaction tube with respect to the flow.

18. The method of claim 15, wherein the second temperature is greater than the first temperature.

19. The method of claim 15, wherein the first electric heating element and the second electric heating element are arranged in parallel with each other along a length of the reaction tube.

20. The method of claim 15, further comprising:
heating a first segment of a second reaction tube via the first electric heating element;
heating a second segment of the second reaction tube via the second electric heating element, wherein the first electric heating element and the second heating element are located between the reaction tube and the second reaction tube in the catalytic reactor.

\* \* \* \* \*